United States Patent
Sloane

[11] Patent Number: 5,918,211
[45] Date of Patent: Jun. 29, 1999

[54] METHOD AND APPARATUS FOR PROMOTING PRODUCTS AND INFLUENCING CONSUMER PURCHASING DECISIONS AT THE POINT-OF-PURCHASE

[75] Inventor: Martin A. Sloane, Great Neck, N.Y.

[73] Assignee: Retail Multimedia Corporation, Great Neck, N.Y.

[21] Appl. No.: 08/655,478

[22] Filed: May 30, 1996

[51] Int. Cl.⁶ .......................... G06F 17/60; G06F 17/00; G06F 19/00
[52] U.S. Cl. .................. 705/16; 705/1; 705/14; 705/18; 705/20; 705/23
[58] Field of Search ................. 705/14, 16, 17, 705/18, 20, 21, 23, 24

[56] References Cited

U.S. PATENT DOCUMENTS

| | | | |
|---|---|---|---|
| 4,723,212 | 2/1988 | Mindrum et al. | 705/14 |
| 4,910,672 | 3/1990 | Off et al. | 705/14 |
| 5,047,614 | 9/1991 | Bianco | 235/385 |
| 5,173,851 | 12/1992 | Off et al. | 705/14 |
| 5,250,789 | 10/1993 | Johnsen | 705/14 |
| 5,361,871 | 11/1994 | Gupta et al. | 186/61 |
| 5,424,524 | 6/1995 | Ruppert et al. | 705/8 |
| 5,457,307 | 10/1995 | Dumont | 235/383 |
| 5,595,264 | 1/1997 | Trotta, Jr. | 186/56 |
| 5,630,071 | 5/1997 | Sakai et al. | 705/21 |

*Primary Examiner*—Allen R. MacDonald
*Assistant Examiner*—James W. Myhre
*Attorney, Agent, or Firm*—Quarles and Brady LLP

[57] ABSTRACT

A system and method for influencing and potentially altering a consumer's purchase decisions at the point-of-purchase in a retail store using a portable bar code scanner that is in constant wireless communication with the store and a retailer/manufacturer's computer/controller. The consumer uses the portable bar code scanner to scan products in the store, and if a scanned product is currently under a promotion, the controller alerts the consumer's portable bar code scanner as to the promotion, so that the consumer can to take advantage of the promotion. In another embodiment, the consumer will be identified before beginning shopping by their frequent shopper card, so that the computer/controller, in communication with the portable bar code scanner, can utilize the consumer's past purchase history and offer the consumer promotional product discounts. A video surveillance camera within the portable bar code scanner also allows the retailer to monitor each portable bar code scanner's use throughout the retail establishment for security purposes.

24 Claims, 6 Drawing Sheets

METHOD AND APPARATUS FOR PROMOTING PRODUCTS AND INFLUENCING CONSUMER PURCHASING DECISIONS AT THE POINT-OF-PURCHASE

BACKGROUND OF THE INVENTION

1. Field of the Invention

The present invention relates to the promotion of consumer products and distribution of discounts, other promotions and information. More particularly, it relates to a method and apparatus for alerting consumers of sales, or other product promotions, to motivate or alter their purchasing decisions at the point-of-purchase, and further, a security system for the apparatus.

2. The Prior Art

When a product manufacturer or retailer is running a product promotion or discount, currently the only way to alert the consumer of these promotions is by sending them circular distributions, coupon mailings, and/or advertising. These methods all have the same drawbacks in that they do not expose the promotion to the consumer when the consumer is in the best position to consider the selection of a product for purchase (i.e., in the aisle of the store and at the point-of-purchase). Thus, the consumer is forced to either remember the promotion and products associated therewith, or remember to bring the coupons or other promotional material when they go to the store.

The most important time in which a consumer is most likely to be motivated by and take advantage of a promotion, is during the shopping experience. More specifically, when the consumer is at the point-of-purchase (i.e., standing in the aisle at the particular retail establishment, and physically looking at the merchandise and deciding what products to purchase). Other attempts made to influence the consumer at the point of purchase are sale signs. These signs have several disadvantages including the expense of printing, and the labor to affix and remove the signs from the shelves. Another problem with sale signs is that they are often inaccurately positioned on the shelf by the store clerks, and can cause further confusion as to what products are the subject of the promotion.

Promotional offers and coupon distribution for competitive products serve to alter the consumer's future purchasing behavior. The most widely used example of this involves coupons printed and distributed at the supermarket or retailer checkout counter based on the items that are purchased (i.e., point-of-sale). These issued coupons must be used on a subsequent trip to the supermarket or retail establishment.

U.S. Pat. Nos. 4,910,672, 4,723,212, and 5,173,851, assigned to Catalina Marketing Corporation, disclose methods of dispensing coupons, including coupons for competitive products, based on a consumer's purchases as they are identified by the bar code scanner mounted inside the checkout counter, and connected to point-of-sale electronic system. Each of the systems disclosed require the use of checkout counter scanners, which are used as point-of-sale devices.

The prior art methods of distributing consumer promotions and coupons, based on checkout scanner information, in an effort to affect future purchasing behavior are inefficient. This inefficiency is due to the fact that a substantial number of the issued discounts or coupons go unused because consumers are required to remember to bring them to the store on their next visit.

Another form of distributing product discounts and promotional information to consumers is through the use of a frequent shopper card or similar customer loyalty program. This card enables the store to identify the consumer at the point-of-sale, and keep track of his or her purchasing history. The retailer/manufacturer generally has an electronic account for each consumer that is a member of the frequent shopper program. This electronic account enables the retailer/manufacturer to record and keep track of every purchase this consumer makes. This purchasing history (in the consumer's electronic account) can subsequently be used to target that consumer for delivery of promotional product information by mail, at the store, etc. Frequent shopper cards also enable the retailer/manufacturer to issue electronic discounts to the consumer at the point-of-sale (checkout counter), or to the consumer's frequent shopper card account. Other methods of issuing electronic coupons or promotions to the consumer's frequent shopper electronic account includes consumer requested promotion/coupons through the use of their home computer and an online computer network, such as, for example, the internet.

The primary drawback with the frequent shopper card systems is that the identity of the consumer is not determined until after the purchase selections have been made. Thus, no information concerning the purchases made on previous shopping trips can be used as a basis for offering the consumer promotional product information during the time these consumers/frequent shopper club members, are making their current purchase selections.

Another significant disadvantage to the frequent shopper card electronic accounts is that the consumer is generally unaware of any discounts, electronic coupons and other promotional information in their account while they are making their purchase selections (i.e., at the point-of-purchase). Therefore, there is a need for a system that can alert the consumer at the point-of-purchase as to the current retail promotions offered to frequent shopper club members and automatically credit the consumer when a promotional product is purchased. The system can also enable the consumer to determine the status of their electronic frequent shopper account, and what discounts, credits, rewards or promotions are available to them before they start shopping.

Currently the only form of security used in conjunction with a consumer operated portable bar code scanner is a spot check or audit. This entails requiring the consumer to empty the contents of their shopping cart and check their receipt item by item. This security system is inefficient because it effectively defeats the purpose of portable bar code scanner, which is to eliminate waiting on a checkout line.

SUMMARY OF THE INVENTION

The present invention provides a method and apparatus for providing consumers with discount and other promotional information at the point-of-purchase. This will influence, and can possibly alter the consumer's purchasing decisions while they are at the point-of-purchase (i.e., in the retail aisle with the products in front of them).

According to the invention, upon entering a retail establishment, such as, for example, a supermarket, the consumer retrieves a portable bar code scanner from a central scanner station or rack that hods multiple scanners. The consumer uses an Identification card that is swiped at the central scanner station. Once the consumer is identified, the central scanner station unlocks one portable bar code scanner and instructs the consumer to take the identified scanner. The portable bar code scanner is a self powered device that is capable of wireless transmission and receiving of data. The portable bar code scanner is in communication with the retailer's computer/controller via the wireless medium at all times.

When the consumer enters a retail establishment, they use an identification to obtain a portable scanner from the central scanner station. The consumer swipes or scans their card in a slot provided in the scanner station. Upon identification of the consumer, the portable bar code scanner station unlocks one of the scanners and indicates to the consumer which scanner to take from the rack.

As the consumer is shopping through the store and browsing products, the consumer can scan the UPC bar codes (or scan a shelf label having the product UPC bar code) for the products they are interested in purchasing and place them in their shopping cart. As the consumer scans the product bar code, either on the product or the shelf, the portable bar code scanner will identify the product and price, will maintain a running total for purchases, and will alert the consumer when a scanned product is currently being offered with some kind of promotion (e.g., buy 2 and receive 50¢ off). The consumer will then be given the option to accept or reject the product and/or promotion. The portable scanner will also alert the consumer of a product promotion for a competitive product or a related product to the consumer scanned product. The consumer will then have the option to reject the scanned product and then find the promoted competitive or related product. These promotion messages sent to the consumer as a result of scanning a product can possibly influence and alter the consumer's purchase decisions at the point-of-purchase.

In another embodiment of the invention, the consumer will retrieve the portable bar code scanner from the scanner center, and in doing so, or immediately thereafter, scan their frequent shopper card bar code in order to identify them to the retailer's computer/controller. This will facilitate the consumer taking advantage of any discounts, credits, reward or product promotions contained and stored in their electronic frequent shopper account. Through the portable bar code scanner, the consumer can be alerted as to the available discounts, credits, rewards or promotions. In the alternative, the portable bar code scanner can alert the consumer as to the presence of the electronic discounts, credits, rewards or promotion in their frequent shopper account when the consumer scans the actual product that is the subject of that promotion.

When the consumer has finished shopping, they return the portable bar code scanner to the scanner center. When the consumer places the portable bar code scanner back into the scanner center, the information stored in the scanner is transferred to the scanner center, or the store's computer is alerted that the selection of products has been completed, and an itemized store receipt is printed. The consumer then takes the receipt to a payment counter where the goods are paid for. Either the portable bar code scanner, or the store computer can maintain the purchase totals, savings totals or other purchase related information for printing upon completion of the consumer's shopping.

The portable bar code scanner, in conjunction with the retailer computer/controller automatically provides the consumer with the discounts, credits, rewards and promotions available for their current purchases, and reflects the same on the printed receipt. In addition, a running total of the purchases, the savings per shopping experience, and year-to-date savings will be shown on the portable scanner, and will also be recorded and printed on the consumer receipt.

A security system is also incorporated into the portable bar code scanner system to deter and prevent consumer theft. A small video camera is disposed within the portable bar code scanner and directed at the scanning face such that a video image of each product scanned is generated. The video signal is transmitted, via the wireless transmission medium, to a central monitoring station where the consumer can be watched and/or recorded. Generally, when a consumer uses the portable bar code scanner, it will be releasably mounted to their shopping cart so that the consumer's hands are free. The video camera will have a viewing range that includes the shopping cart. This will enable the surveillance of the scanned products and the products being placed into the cart.

It is therefore an object of the present invention to provide a method and apparatus for reducing the cost of alerting consumers to sales and other promotional information at the point-of-purchase.

It is another object of the invention to provide a method and apparatus for altering the consumer's purchasing behavior and decisions at the point-of-purchase.

It is a further object of the invention to provide a method and apparatus for alerting consumers at the point-of-purchase, as to discounts and other promotional product information for other products that are competitive with or related to the products consumers are considering for purchase.

Yet another object of the invention is to provide a method and apparatus for identifying a consumer at the start of the shopping experience and offering promotional and discount information based on their past purchasing history, or membership in a frequent shopper program.

An additional object of the invention is to provide a method and apparatus for altering the consumer's purchase behavior and decisions at the point-of-purchase that includes a security system for preventing consumer theft.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
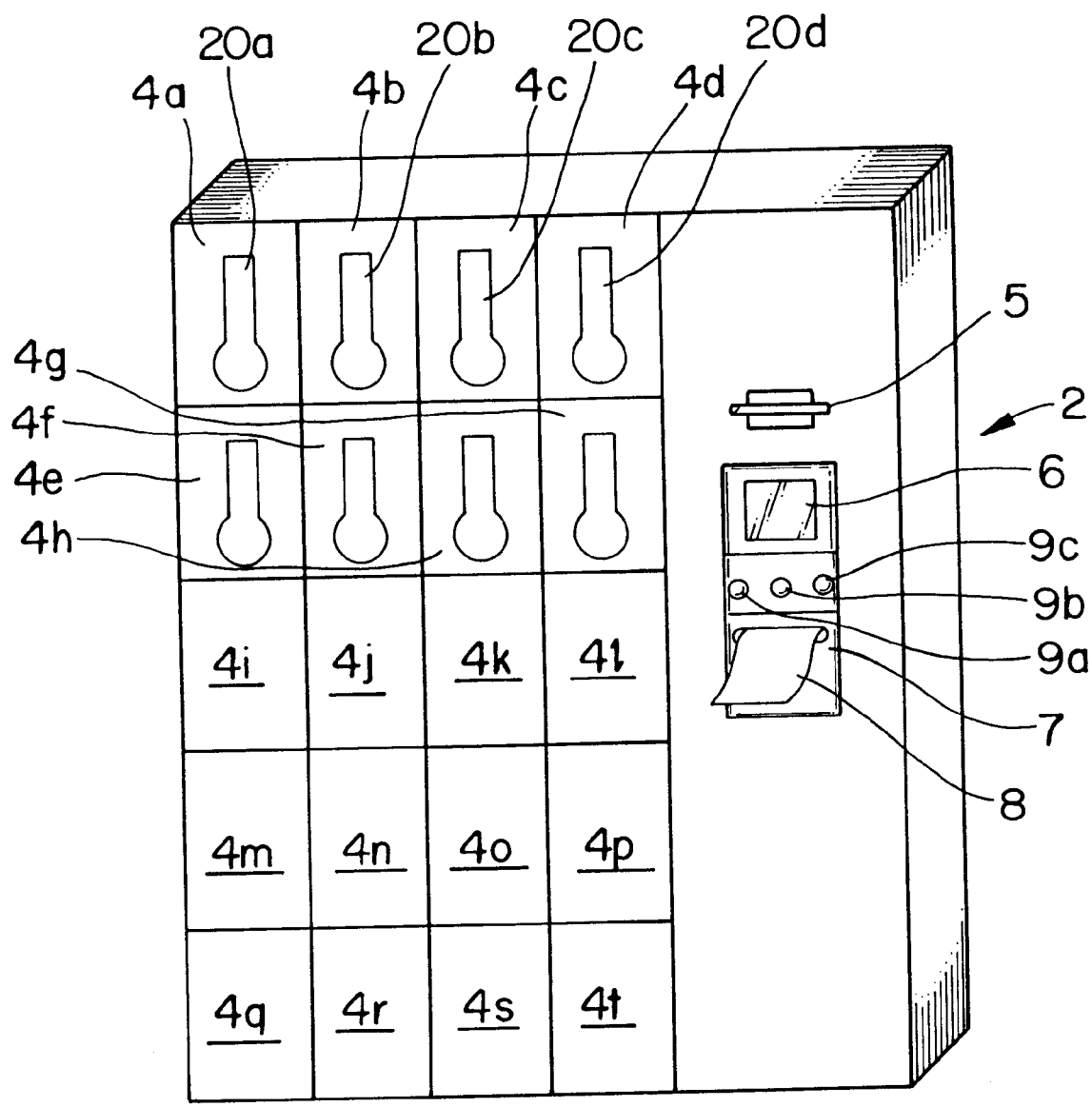
FIG. 1 is a perspective view of a portable bar code scanner center within a retail establishment.

FIG. 1 shows a portable bar code scanner center station 2 that is located at the entrance of a retail establishment. Station 2 has a plurality of receiving compartments 4a–4t, each for storing a portable bar code scanner 20–20d, respectively. When a consumer enters the retail establishment, they can provide required identification by inserting in the center an identification card or code in order to retrieve one of the portable bar code scanners 20 and use it during their shopping experience. For example, in order to retrieve a scanner 20, the consumer uses an identification card (not shown) and swipes it through card reader 5. Card reader 5 can be any suitable known card reader, and can use magnetic, electronic or optical technology, and the consumer identification card (not shown) will also be magnetic, electronic or optical depending on the card reader format. As an incentive to motivate the consumer to try this system, the scanner control center 2 will offer the consumer a promotion related to the use of the system, which could include entering the consumer in a sweepstakes contest upon removal of a scanner 20 from its respective compartment 4a–4t and identification of the consumer. Card reader 5 can also be a scanner capable of scanning a consumer's frequent shopper card bar code, and thereby identify the consumer.

Once the consumer is identified, scanner center 2 unlocks one of the portable bar code scanners, such as, for example, 20a, and display 6 tells the consumer to take scanner 20a from the scanner center. After a consumer has completed their shopping, the scanner 20a is returned to it's original compartment 4a, and scanner center 2 receives the purchase information stored in scanner 20a, and printer 7 prints an itemized store tape receipt 8. The consumer then pays for the items and leaves the retail establishment. Scanner 20 has an internal RAM or other suitable memory means for storing the consumer purchases and a processor for enabling the scanner to maintain purchase and savings totals.

Scanner center 2 includes some control buttons 9a–9c that can be used for various functions. For example, a retailer, or product manufacturer may be offering coupons or product discounts to consumers who request them. Using control buttons 9a–9c, or one of the function buttons 38, 40, 42 or trigger 46 mounted on scanner 20. Scanner center 2 can enable the consumer to select which promotions he would like to participate in, and have a coupon or other promotion printed by printer 7. In another alternative, the product manufacturers can also offer recipes to their product users. These recipes can be printed by printer 7 when the consumer makes that selection and presses a corresponding button 9a–9c. Printer 7 has a display 6 that provides the consumer interface with scanner center 2. Display 6 can be a liquid crystal display (LCD) or any other known suitable display.

Figure 2A:
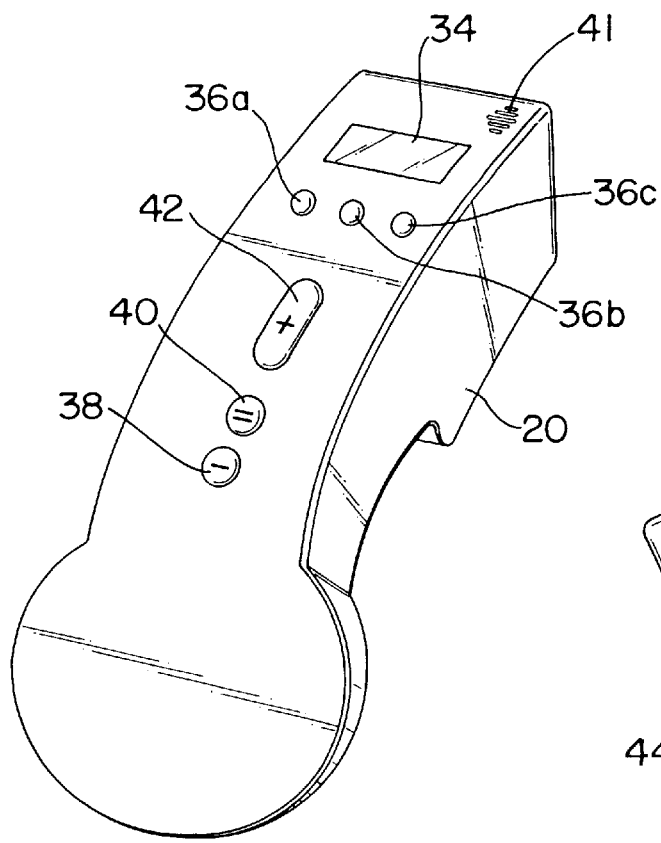
FIG. 2a is a perspective view of the portable bar code scanner according to the invention.

FIG. 2a shows an example of a portable bar code scanner according to the invention. Portable bar code scanners are widely known and used throughout the world. An example of a portable personal scanner used in retail establishments is the LAST 3803 produced by Symbol Technologies, Inc., Bohemia, N.Y. Examples of other portable scanners are shown by U.S. Pat. Nos. 5,107,100, 5,149,950, 5,229,590, and 5,315,097 which are hereby incorporated by reference.

Portable bar code scanner 20 has a display 34 for showing messages to the consumer, a plus button 42, a minus button 38 and an equal button 40. When a consumer scans a product, display 34 will show the product's price, in addition to showing any promotional information available for that product or a related product. After scanning the product, the consumer can then decide to add this product to his or her current product total by pressing the plus button 42. If the consumer decides not to accept the product, he can put it back and scan another item. If the consumer accepts the product and then decides he doesn't want to purchase it, they can scan it again and then press the minus button 38 to remove it from his purchase list. Plus and minus buttons 42 and 38, respectively, can also be used by the consumer to accept or reject a product which is the subject of a promotion message observed by the consumer on the display of the portable scanner 20. The consumer can use the equal button 40 at any time to see their current running balance on products purchased.

Figure 2B:
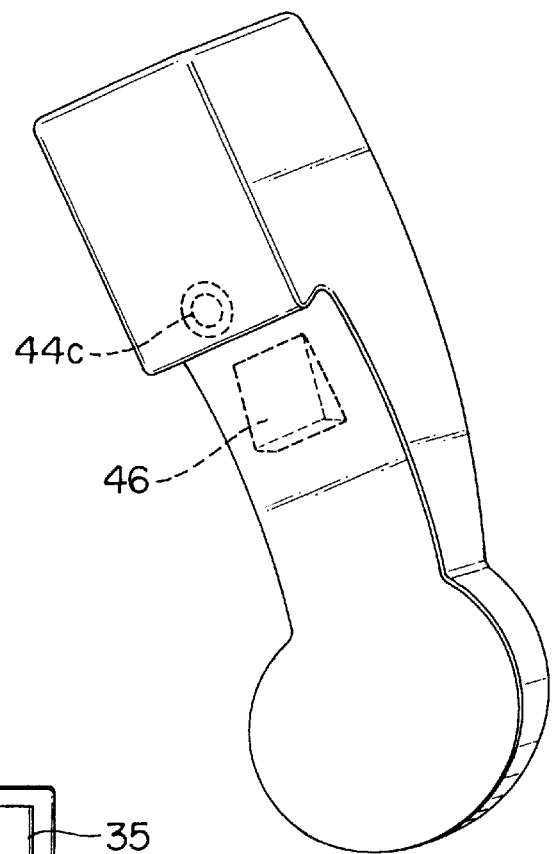
FIG. 2b is a bottom side perspective view of the portable bar code scanner according to the invention.

Portable bar code scanner 20 includes indicator lights 36a–36c for indicating to the consumer the occurrence of certain events, such as, for example, ready to scan, a discount being offered, a product promotion, or any other message or event that the retailer/manufacturer feels is necessary to alert the consumer. During operation, portable bar code scanner 20 will scan a product UPC bar code, or a shelf label having the product UPC code as it is passed by the scanning face 35. FIG. 2b shows an alterative embodiment of scanner 20 with a trigger switch 46 added on the underside. Trigger switch 46 could be incorporated into scanner 20 such that said scanner would only scan a product when said trigger is depressed. A speaker 41 is provided within scanner 20 for providing an audible alert signal or audible message, to the consumer when desired.

Figure 2C:
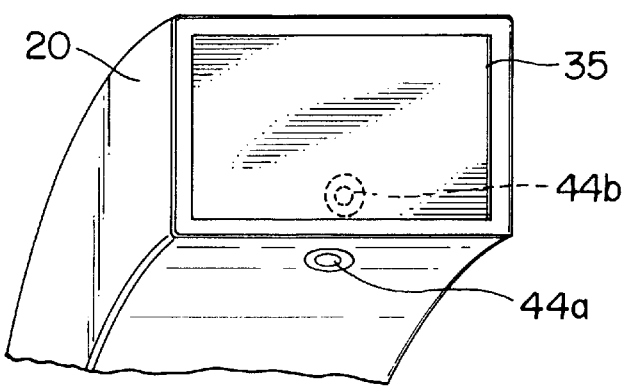
FIG. 2c is a front view of the portable bar code scanner according to the invention.
Figure 12:
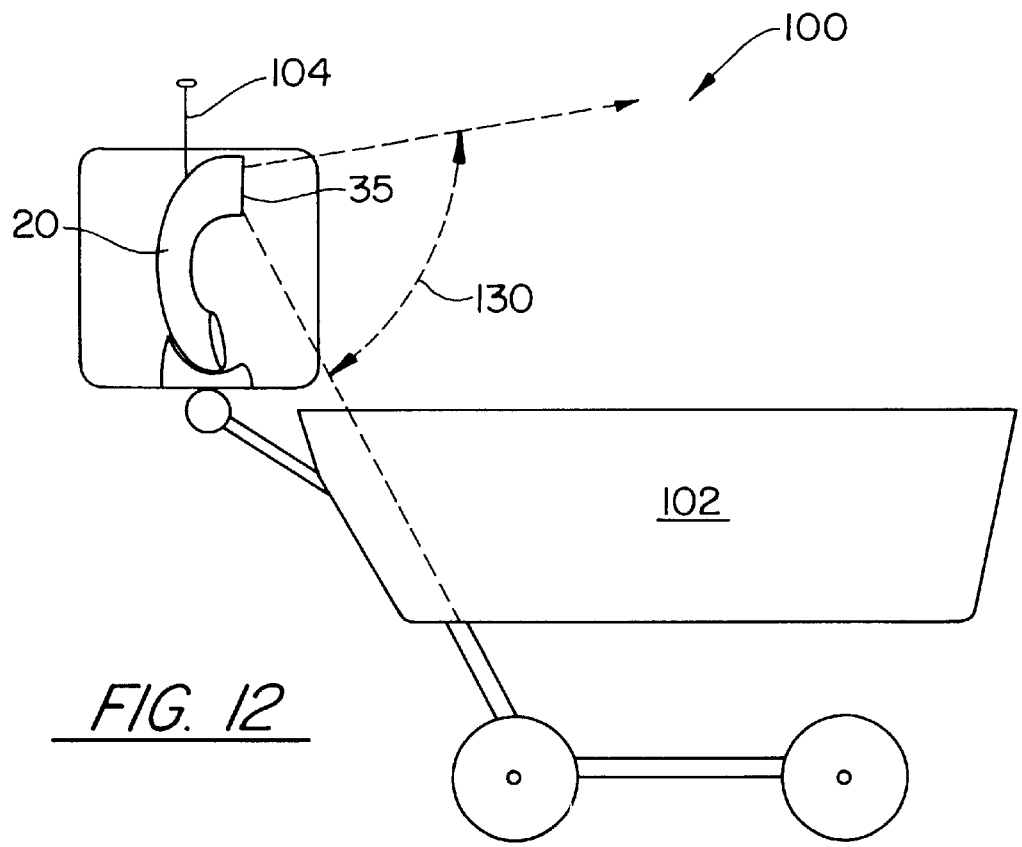
FIG. 12 is a schematic diagram of the apparatus according to the invention.

A video camera 44a is shown disposed immediately under scanning face 35 (FIG. 2c). Alternative placements for the video camera are shown by 44b and 44c. The video camera can be placed anywhere on scanner 20 such that it can view the product being scanned as it is passed by the scanning face 35. Scanner 20 can be releasably mounted on the consumer shopping cart such that video camera 44a can view the open shopping cart and its contents as a new product is scanned and placed into the cart (FIG. 12).

The portable bar code scanner 20, in conjunction with retailer computer/controller 12, will maintain a running total of the purchases made by the user, enable the user to view their current savings on this shopping trip and all of their shopping trips year-to-date, and more importantly will eliminate waiting on a checkout line to have the purchases rung up (scanned) by the cashier.

Figure 3A:
FIG. 3a is a block diagram of the first step of the method for promoting products and influencing consumer purchasing decisions at the point of purchase, according to the invention.
Figure 3B:
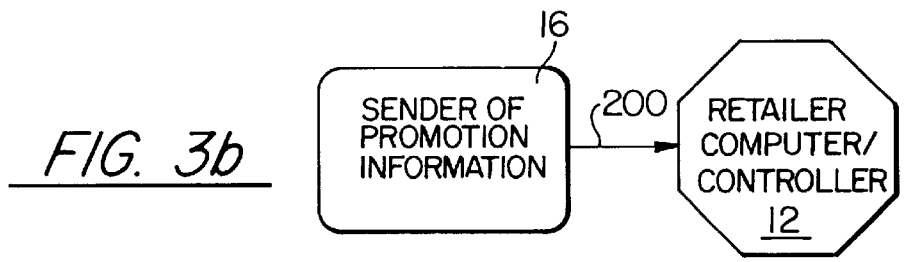
FIG. 3b is a block diagram of an alternative first step of the method according to the invention.

FIG. 3a shows the first step of the method according to the invention. A retailer 14 designates items that are on sale, or offered with some other consumer promotion or message, and instructs the retailer computer/controller 12 to offer these promotions to the consumer when one of the subject items or related items are selected (i.e., scanned) by the consumer. FIG. 3b shows an alternative first step to the method where the sender of promotion information 16 can be someone other than the retailer, such as, for example, the product manufacturer. The sender of promotion information 16 sends the information to the retailer computer/controller 12 via communication line 200. Communication line 200 can be any suitable known means for connecting computers and enabling them to communicate with each other. Examples of communication line 200 can be a direct modem connection between two computers (null modem), an online computer network, such as a Local Area Network (LAN) or a Wide Area Network (WAN). Line 200 can also include communication over the internet. Retailer computer/controller 12 is programmed to receive and store the promotional information sent by retailer 14 or sender 16, and can therefore offer the promotions at the appropriate time and to the appropriate consumer.

Retailer computer/controller 12 also receives and stores consumer information through their frequent shopper card accounts. This information can include previous shopping history, types of products purchased, the time when products were purchased and any other information deemed valuable to the retailer or product manufacturer for purposes of marketing. Retailer computer/controller 12 can store all this information using any suitable known methods of data storage, such as hard disk storage, optical storage mediums, magnetic tape storage, etc. The data storage means used remains accessible at all times such that the system can be updated with new information, and consistently referred to for purposes of offering consumer product promotions to selected consumers.

Figure 4:
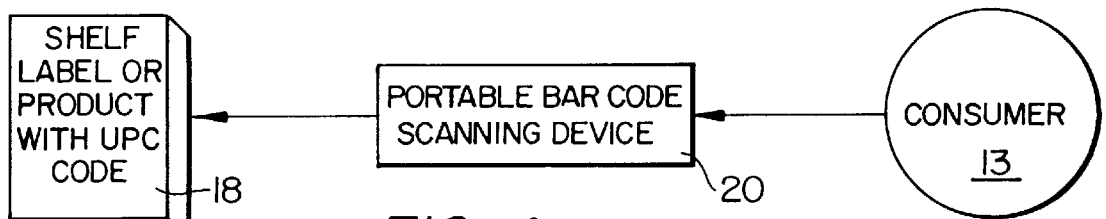
FIG. 4 is a block diagram of the second step of the method according to the invention.

FIG. 4 shows the second step of the method according to the invention. A consumer 14 uses a portable bar code scanner device 20 to scan a shelf label or product 18 having a UPC code. The portable scanner 20 can be releasably mounted on the consumers shopping cart such that the consumer can use the scanner and keep both hands free (FIG. 12).

Figure 5:
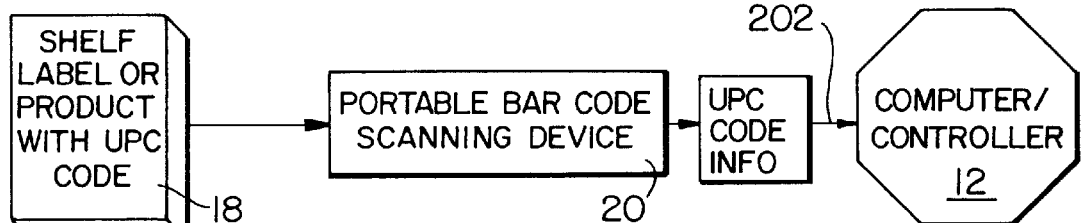
FIG. 5 is a block diagram of the third step of the method according to the invention.

Once the consumer scans the shelf label or product 18, portable bar code scanner 20 transmits the product code information to the retailer computer/controller 12 via wireless transmission medium 202 (FIG. 5). The wireless transmission of information can be performed by any suitable known means, such as, for example, radio frequencies (RF), infrared, cellular, shortwave, and any other known method of transmitting and receiving information without use of direct wire connections.

There will be many portable bar code scanners 20 in any one retail establishment. Thus, in using wireless transmission mediums, multiple transmissions may take place on one frequency provided they are each coded. This type of coded frequency transmission is well known in the art. An alternative method is using separate frequencies for each scanner 20.

Figure 6:
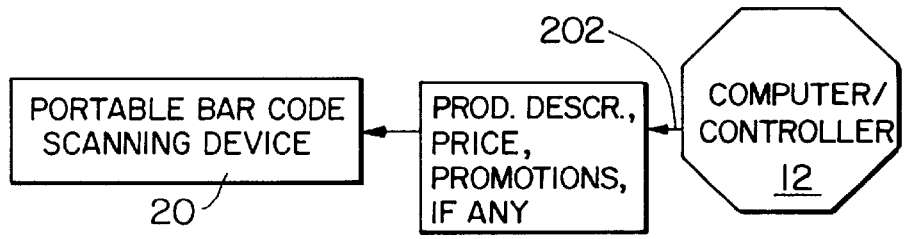
FIG. 6 is a block diagram of the fourth step of the method according to the invention.
Figure 7:
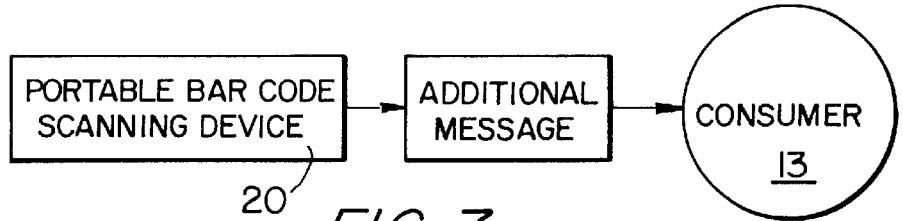
FIG. 7 is a block diagram of the fifth step of the method according to the invention.

After the portable bar code scanner 20 has sent the product code information to computer/controller 12, the computer/controller 12 sends the product description and price information on the scanned product to the portable bar code scanner via wireless transmission medium 202 (FIG. 6). Based on the received promotional product information by retailer 14 or sender 16, computer/controller 12 determines if the scanned item is a designated sale item, and if it is, sends a message to the scanner 20 which offers the consumer the discount or promotion (FIG. 7). The consumer 13 can then decide if he would like to purchase the sale item. In addition to the discount or promotion offered to the consumer, computer/controller 12 can also send additional promotional messages to the consumer based on the product bar code information just received.

Figure 8A:
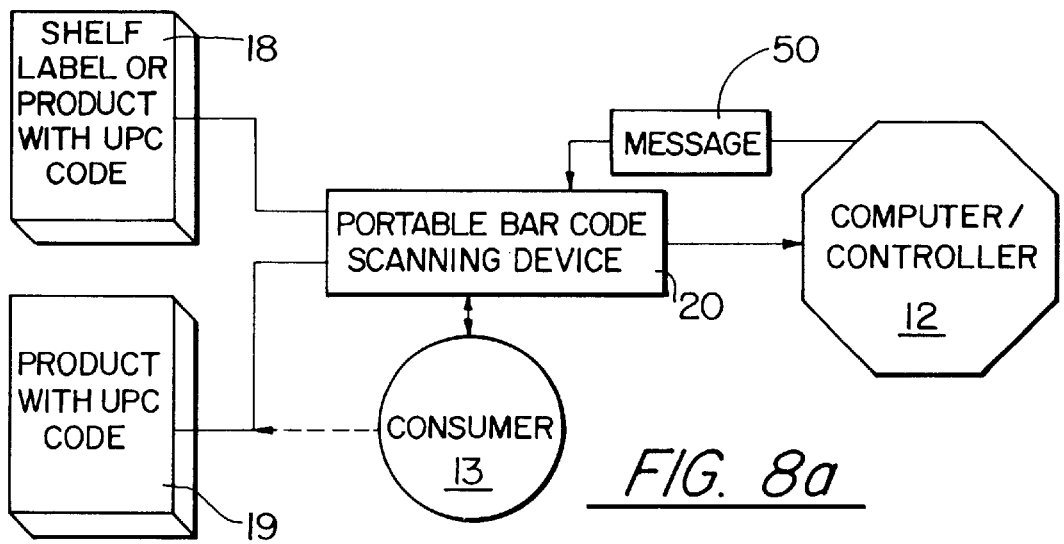
FIG. 8a is a block diagram of the sixth step of the method according to the invention.
Figure 8B:
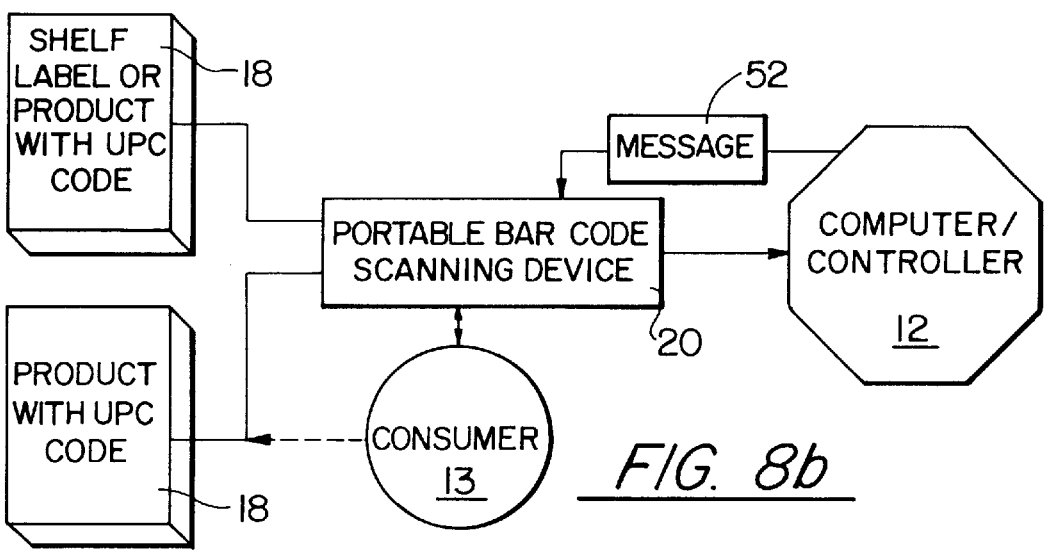
FIG. 8b is a block diagram of an alternative sixth step of the method according to the invention.
Figure 8C:
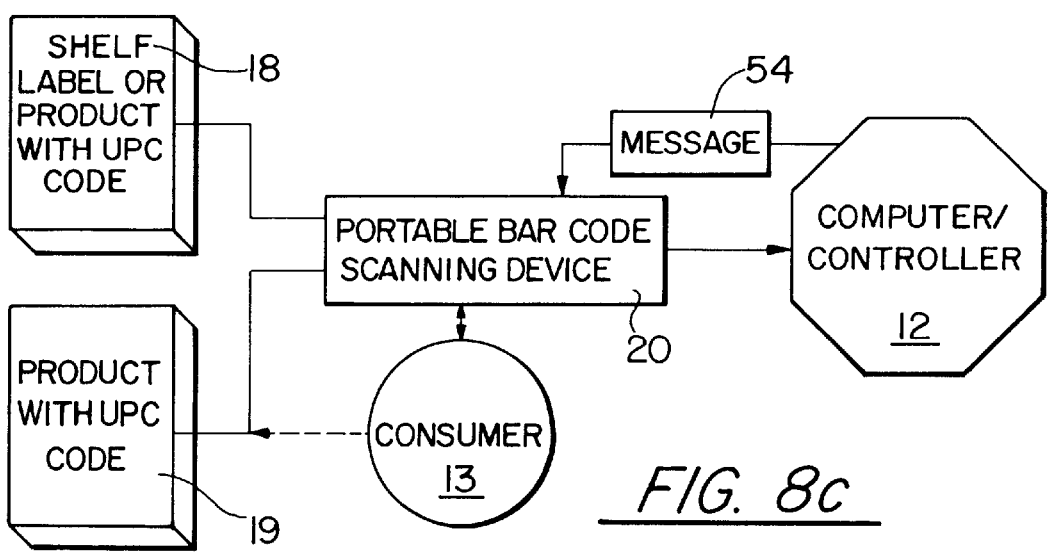
FIG. 8c is a block diagram of another alternative sixth step of the method according to the invention.

FIGS. 8a–8c show examples of additional messages that could be sent to consumer 13 using the portable bar code scanner 20 (FIG. 7) by the computer/controller 12. In the first example, consumer 13, using portable bar code scanner 20, scans the shelf label or product 18 with the UPC code. Portable bar code scanner 20 sends the product information to computer/controller 12. Computer/controller 12 then sends a message 50 to portable bar code scanner 20 for consumer 13 to see. Message 50, in this instance, can tell consumer 13 that a competitive product, or other products in the same product category as scanned label or product 18, are being offered at a discount, or with another consumer promotion. Consumer 13 then finds the promoted product 19 being offered, scans it's shelf label or the product itself with scanner 20, and the scanner then displays the discount. Consumer 13 can then decide to accept or reject the product using the portable bar code scanner 20.

FIG. 8b shows another example of a different promotion message 52 being presented to the consumer. Consumer 13 scans the shelf label or product 18 and computer/controlled 12 sends a message 52 back to scanner 20 based on the scanned product information. Message 52 tells the consumer that a discount is being offered if a certain quantity of the scanned item is purchased. Consumer 13 can then choose to purchase the additional products 18, and scanner 20 will automatically subtract the discount from the items when the proper number of them have been scanned.

FIG. 8c shows another example of a promotion message being sent to the consumer 13 after having scanned a shelf label or product 18. Message 54 tells the consumer that a discount is being offered on a complimentary/related product elsewhere in the store. If consumer 13 locates and scans the related product 19 required for the promotion, computer/controller 12 automatically subtracts the discount from the price of the item and records the purchase at the discounted price.

Figure 9:
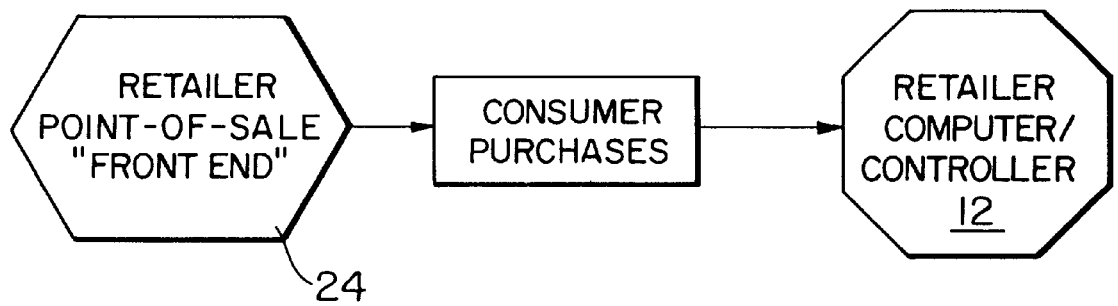
FIG. 9 is a block diagram of the first step of a second embodiment of the method for promoting products and, influencing consumer purchasing decisions at the point of purchase, according to the invention.

FIG. 9 shows a point of sale system 24 coupled to the computer/controller 12. When a consumer makes a purchase and uses his frequent shopper card, the information as to his purchases are stored in a database within computer/controller 12. At this time, the consumer may receive immediate discounts or electronic credits and other promotional discounts that can be redeemed during any subsequent visit to the store. The consumer promotions that "carry forward" require the consumer to return to the retail establishment to redeem them. The electronic consumer account linked to the frequent shopper card enables the retailer to monitor the purchasing habits of consumers and potentially use this information to target them for other product promotions.

Generally, the electronic credits and promotional discounts are applied to an electronic consumer account linked to each frequent shopper card 30. Thus, when the consumer returns to the retail establishment, he will receive the benefit of the previously awarded credits. The consumer is not always aware of electronic credits, coupons or promotional discounts that have been applied to his electronic consumer account.

Figure 10:
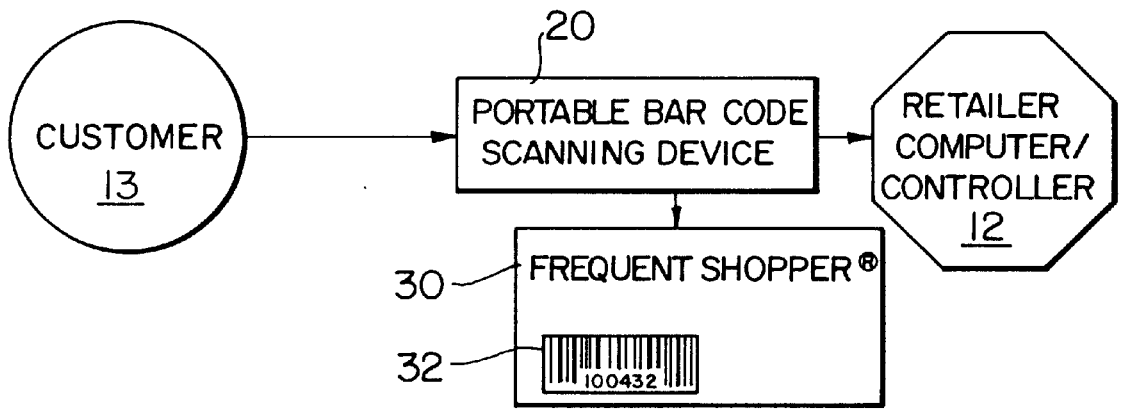
FIG. 10 is a block diagram of the second step of the second embodiment of the method according to the invention.
Figure 11:
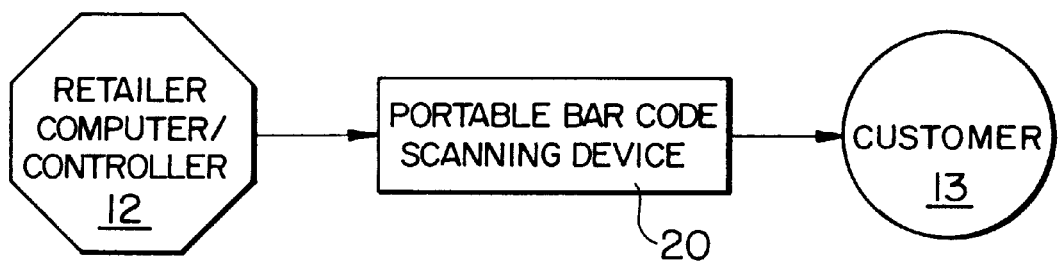
FIG. 11 is a block diagram of the third step of the second embodiment of the method according to the invention.

FIG. 10 shows the consumer 13 using his portable bar code scanner 20 to scan the bar code 32 on his frequent shopper card 30 (or as accomplished when the consumer obtains the portable scanner 20 from the scanner center 2) before the consumer starts shopping. The retailer's computer/controller 12 (FIG. 12) accesses the consumer's purchase history, and based on instructions from the computer/controller sends a message to portable bar code scanner 20 offering the consumer discounts, promotions or other information based upon his part purchasing history. In addition, the consumer will also receive messages indicating the current status of their electronic frequent shopper account, and any discounts, credits or awards and promotions that may be available. Thus, the consumer will know of any electronic credits or discounts prior to starting their shopping, so as to possibly influence their present shopping behavior.

FIG. 12 shows a system 100 according to the invention wherein a portable bar code scanner 20 is releasably mounted on a shopping cart 102. Portable bar code scanner 20 has an antenna 104 that is preferably mounted internally in scanner 20. Scanning face 25 is disposed such that the consumer can easily scan a product and drop it into their shopping cart 102.

Figure 13:
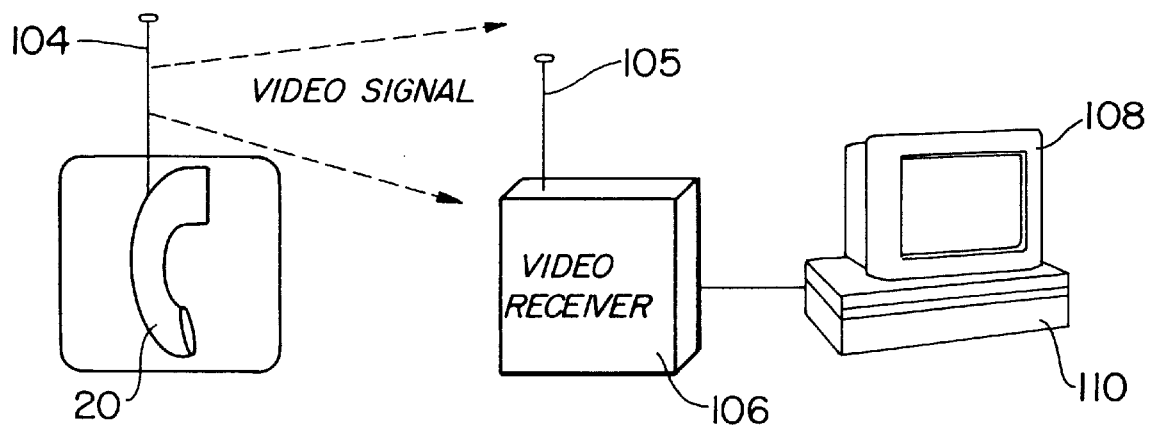
FIG. 13 is a schematic diagram of the security system according to the invention.

FIGS. 12 and 13 show the incorporation of a security system for preventing theft of products including placing them into the shopping cart without scanning them. A small video camera 44a (FIG. 2c) is disposed in scanner 20 so that when the scanner is mounted on cart 102, it faces into the shopping cart, and has a viewing range 130 that can be in a range of 10–180° or more if necessary. Scanner 20 will transmit the video signal to a video receiver 106, which is connected to a video monitor 108 and video recorder 110 in a central monitoring station (not shown). The use of the scanner 20, as well as the area of the store within the camera's view, can now be visually monitored while the consumer is shopping. Since scanner 20 is in constant communication with the retailer's computer/controller 12, a consumer can be monitored by watching his scanning activity in conjunction with the video surveillance to determine if any theft is taking place.

While several embodiments of the present invention have been shown and described, it is to be understood that many changes and modifications may be made thereunto without departing from the spirit and scope of the invention as defined in the appended claims.

What is claimed is:

1. An apparatus for promoting consumer products having UPC bar codes at the point-of-purchase within a retail establishment, comprising:

processing means including data receiving means for receiving consumer product and promotional information, data storage means for storing the received consumer, product and promotional information, and data transmission means for transmitting the stored consumer product and promotional information within the retail establishment;

at least one portable bar code scanner for use by a consumer during shopping, and having scanning means for scanning the UPC bar code, a transmitter for transmitting the scanned UPC bar code information to said processing means, a receiver for receiving consumer product and promotional information transmitted from said data transmission means, and user controls for allowing the consumer to control the portable bar code scanner functions;

security means incorporated into said portable bar code scanner; and, said processing means selectively transmitting consumer product and promotional information to said portable bar code scanner based upon the consumer scanned UPC bar code. receiver and the retailer/manufacturer's computer via a local area network.

2. The apparatus according to claim 1, wherein said data receiving means comprises:

a first receiver for receiving consumer product and promotional information form a retailer/manufacturer;

a first connection means for connecting a retailer/manufacturer's computer with said first receiver means for receiving consumer product and promotional information;

a second receiver for receiving the scanned UPC bar code from said at least one portable bar code scanner.

3. The apparatus according to claim 2, wherein said first connection means comprises a connecting said first reciver and the retailer/manufacturer's computer via a local area network.

4. The apparatus according to claim 2, wherein said first connection means comprises a direct modem connection between said first receiver and the retailer/manufacturer's computer.

5. The apparatus according to claim 2, wherein said first connection means comprises connecting said first receiver and the retailer/manufacturer's computer via an online network.

6. The apparatus according to claim 1, wherein said at least one portable bar code scanner includes indicating means in communication with said processing means for providing visual product description and price information to the consumer, said indicating means alerting the consumer with consumer product promotional information based on the scanned UPC bar code information received.

7. The apparatus according to claim 6, wherein said indicating means comprises a display portion, at least one indicator light, and at least one audible alarm.

8. The apparatus according to claim 1, wherein said security means comprises:

a video surveillance camera mounted in said portable bar code scanner for generating a video signal of a scanned UPC bar code and its surrounding area when the scanning faced is passed by the UPC bar code;

video transmitter for transmitting the received video signal;

a monitoring station having a video receiver for receiving the transmitted video signal, at least one video monitor for viewing said received video signal, and at least one video recorder for recording said received video signal; and mounting means disposed on a shopping cart for releasably mounting said portable bar code scanner to the cart to enable hands free operation of said scanner.

9. The apparatus according to claim 8, wherein the shopping cart has a product receiving area, said mounting means positioning said portable bar code scanner such that said video camera has a field of view that includes the product receiving area of the shopping cart.

10. The apparatus according to claim 1, further comprising:

identification means for identifying a consumer prior to starting their shopping and providing identification information;

said portable bar code scanner receiving said identification means and transmitting said identification information to said processing means for storing said information; and said processing means comparing the stored identification information with the store consumer product promotional information, and selectively transmitting consumer product and promotional information to said at least one bar code scanner.

11. The apparatus according to claim 10, wherein said identification means comprises a consumer card having at least one scannable bar code for being scanned by the portable bar code scanner.

12. The apparatus according to claim 11, wherein said consumer identification information consists of the consumer's identity, and the purchasing history of the identified consumer.

13. The apparatus according to claim 1, further comprising:
   a portable bar code scanner center station having a plurality of compartments for receiving and storing said portable bar code scanners, said portable bar code center station having display means for providing an interface with the consumer, printing means for printing receipts and other promotional information, and identification receiving means for receiving consumer identification information.

14. The apparatus according to claim 13, wherein said the consumer pays for the goods purchased at the checkout center and thereby eliminates waiting on retail store checkout lines.

15. The apparatus according to claim 14, wherein said identification receiving means comprises an opening in said portable bar code scanner center for receiving the consumer's identification information.

16. A method of promoting products having UPC bar codes at the point-of-purchase within retail establishments comprising the steps of:
   sending consumer product and promotional information to a controller;
   storing the consumer product and promotional information in the controller;
   providing a consumer with a portable bar code scanner as the consumer begins retail shopping, the scanner being in wireless communication with the controller;
   scanning a product's UPC bar code with the portable scanner;
   monitoring said scanning step with security means incorporated into said portable bar code scanner;
   sending the scanned product UPC bar code information to the controller;
   sending product description, price and promotional information to the bar code scanner based on the scanned UPC code and promotional consumer product information stored in the controller; and,
   alerting the consumer at the point-of-purchase as to any specific product discounts and promotions being offered.

17. The method according to claim 16, wherein said step of sending consumer product and promotional information to the controller is performed by a retailer/manufacturer's computer connected to the controller via an online computer network.

18. The method according to claim 16, wherein said step of sending consumer product and promotional information to the controller is performed by a retailer/manufacturer's computer connected to the controller via a Local Area Network (LAN).

19. The method according to claim 16, wherein said step of sending consumer product and promotional information to the controller is performed by a retailer/manufacturer's computer connected to the controller via a direct modem connection (Null Modem).

20. The method according to claim 16, further comprising the step of identifying the consumer and accessing their past purchase history prior to beginning their shopping with the portable bar code scanner.

21. The method according to claim 20, further comprising the step of comparing the consumer past purchase history to the consumer promotional information within the controller.

22. The method according to claim 20, wherein the steps of sending product description, price and promotional information to the bar code scanner and alerting the consumer as to available product discounts and promotions is further based on the comparison of the identified consumer's past purchase history and the available consumer promotions within the controller.

23. The method according to claim 16, wherein said step of alerting the consumer at the point-of-purchase is performed by at least one indicator light on the portable bar code scanner, and at least on audible alarm within the portable bar code scanner.

24. The method according to claim 16, further comprising the step of:
   providing a portable bar code scanner center where the consumer receives the portable bar code scanner prior to beginning shopping, and returns the portable bar code scanner after completing their shopping; and
   printing an itemized receipt of the consumer's total purchases, including discounts, credits, rewards and promotions received during shopping, said printing being performed by the portable bar code scanner center when a consumer returns a used scanner to the scanner center.

* * * * *